(12) United States Patent
Gorham

(10) Patent No.: US 8,939,486 B2
(45) Date of Patent: Jan. 27, 2015

(54) CENTER EXPANDING CHUCK

(71) Applicant: The Steelastic Co., LLC, Akron, OH (US)

(72) Inventor: Eric William Gorham, Akron, OH (US)

(73) Assignee: The Steelastic Company LLC, Akron, OH (US)

( * ) Notice: Subject to any disclaimer, the term of this patent is extended or adjusted under 35 U.S.C. 154(b) by 13 days.

(21) Appl. No.: 13/837,233

(22) Filed: Mar. 15, 2013

(65) Prior Publication Data

US 2014/0265400 A1    Sep. 18, 2014

(51) Int. Cl.
*B66C 1/54*      (2006.01)
*B25J 15/00*    (2006.01)

(52) U.S. Cl.
CPC .................................. *B25J 15/0047* (2013.01)
USPC ................. 294/94; 294/93; 425/36; 425/48

(58) Field of Classification Search
CPC .............. B29D 30/06; B29D 30/0629; B29D 30/0603; B66C 1/44; B66C 1/54; B66C 1/56
USPC .................. 294/94, 119.1, 119.2, 93, 96, 97; 425/36, 38, 48, 26, 39, 46, 47; 157/1.17; 156/417, 403, 421.6
See application file for complete search history.

(56) References Cited

U.S. PATENT DOCUMENTS

| | | | |
|---|---|---|---|
| 2,514,215 A * | 7/1950 | Stevens et al. | 425/36 |
| 2,641,307 A * | 6/1953 | McKinney et al. | 267/117 |
| 2,642,307 A | 6/1953 | Olson | |
| 3,584,335 A * | 6/1971 | Ulm et al. | 425/36 |
| 4,279,438 A | 7/1981 | Singh | |
| 4,395,209 A | 7/1983 | Singh et al. | |
| 4,401,422 A | 8/1983 | Amano et al. | |
| 4,608,219 A | 8/1986 | Singh et al. | |
| 4,768,937 A * | 9/1988 | Singh | 425/36 |
| 4,772,351 A * | 9/1988 | Thompson et al. | 156/417 |
| 5,127,811 A * | 7/1992 | Trethowan | 425/36 |
| 5,395,150 A | 3/1995 | Imler et al. | |
| 6,615,649 B1 * | 9/2003 | Kokubu et al. | 73/146 |
| 7,172,396 B2 * | 2/2007 | Galigani et al. | 425/36 |
| 7,740,788 B2 * | 6/2010 | Yoshino et al. | 264/326 |
| 2011/0089709 A1 * | 4/2011 | Neeper | 294/119.1 |

FOREIGN PATENT DOCUMENTS

| | | |
|---|---|---|
| DE | 3300801 | 2/1984 |
| JP | 58179633 | 10/1983 |
| WO | WO9850223 | 11/1998 |

* cited by examiner

*Primary Examiner* — Paul T Chin
(74) *Attorney, Agent, or Firm* — Brinks Gilson & Lione

(57) ABSTRACT

A system for handling an object comprises a guide plate, a center hub rotatable relative to the guide plate, a plurality of slots disposed in the guide plate, and a plurality of arms each having first and second ends. The first end of each of the plurality of arms is coupled to the center hub, and the second end of each of the plurality of arms is coupled to an associated slot of the plurality of slots. Rotation of the center hub in a first direction causes the second end of each of the plurality of arms to move radially outward within the associated slot in an extended state. An outer surface of a first arm of the plurality of arms may be nested against an inner surface of a second arm of the plurality of arms in a retracted state.

20 Claims, 4 Drawing Sheets

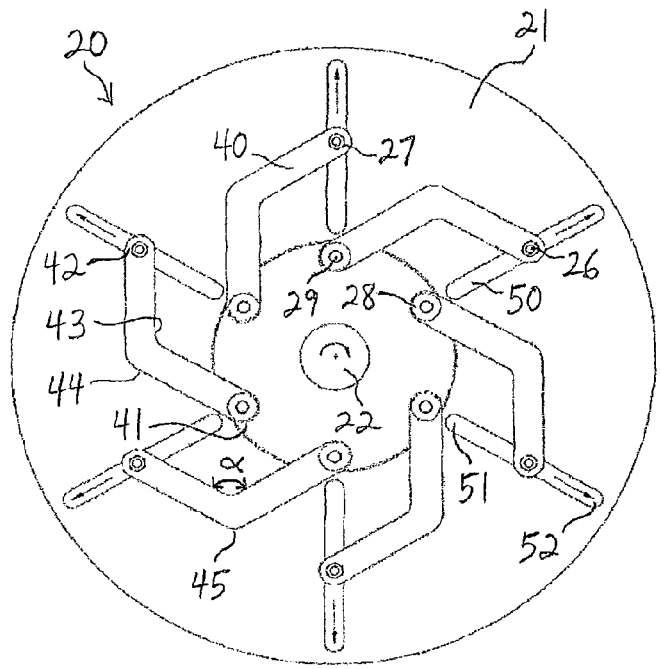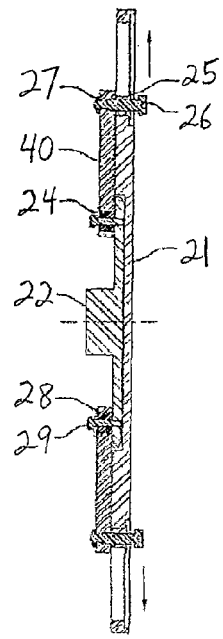
FIG. 1  FIG. 2
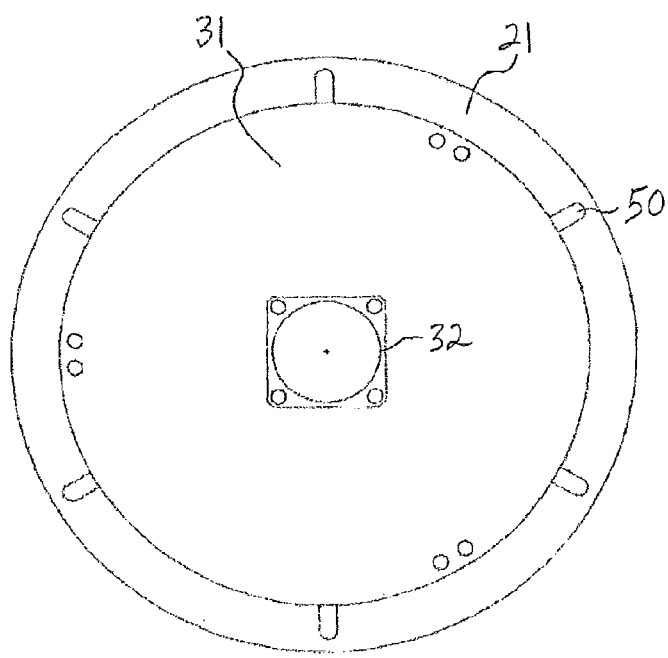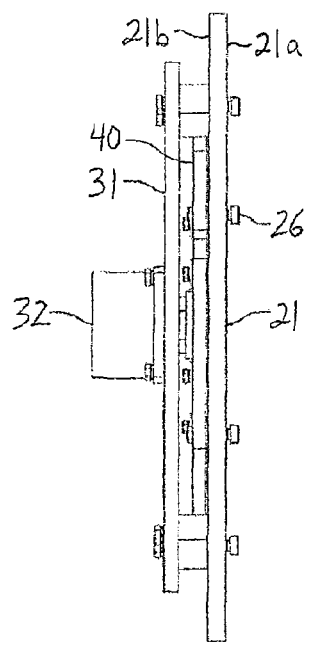
FIG. 3  FIG. 4

US 8,939,486 B2

CENTER EXPANDING CHUCK

BACKGROUND

The present embodiments relate generally to a system for gripping and holding an object, such as a tire bead apex or bead separator spacer, within a machine.

During normal production a rubber apex strip is pressed onto a tire bead. The tire bead apex is then dropped on a conveyor to be stacked for removal. The random dropping on the conveyor leaves the tire bead apex to be in a different position for every cycle. In many to systems, the tire bead apex must then be centered by a centering device before it can be picked up with a magnetic chuck apparatus.

Prior attempts to expand on an inner diameter of such components have required an offset stationary arm. This results in a center hub that would change positions based upon varying diameters making it difficult to locate multiple beads in the same location every cycle. In some instances, systems have required either the chuck or the bead to be located in a different position that was dependent upon the size of the inside diameter of the tire bead or spacer.

Other systems have used four grippers that are initially located in a square shape. As the mechanism expands, the grippers translate linearly in a rectangular direction causing the tire bead to stretch into an oval shape.

Still further systems have attempted to grip an inside of a full tire using a mechanism having multiple linkages that are extendable radially outward in order to engage the inside of the tire. However, the linkages of such systems are generally bulky and cannot be compacted to a relatively small size. Additionally, actuation of such systems tends to require either manual movement of one or more drive linkages, difficult adjustments in order to precisely align with a given tire diameter, or a relatively complicated arrangement of actuation linkages between a drive member and gripping part.

SUMMARY

A system for handling an object comprises a guide plate, a center hub rotatable relative to the guide plate, a plurality of slots disposed in the guide plate, and a plurality of arms each having first and second ends. The first end of each of the plurality of arms is coupled to the center hub, and the second end of each of the plurality of arms is coupled to an associated slot of the plurality of slots. Rotation of the center hub in a first direction causes the second end of each of the plurality of arms to move radially outward within the associated slot to facilitate engagement with an object in an extended state. An outer surface of a first arm of the plurality of arms may be nested against an inner surface of a second arm of the plurality of arms in a retracted state.

A rotary actuator may be aligned with the center hub. The rotary actuator rotates the center hub in the first direction to achieve the extended state, and further in a second direction to achieve the retracted state.

In one embodiment, each of the plurality of arms comprises an angle between the first and second ends. The angle may be greater than 90 degrees and less than 180 degrees. The angle of each of the plurality of arms may be disposed at a center point between the first and second ends.

In one embodiment, the first arm comprises a first segment disposed between the first end and the center point, and further comprises a second segment disposed between the second end and the center point. The first segment is disposed radially inward of an adjacent arm in the retracted state. Further, the second segment is disposed radially outward of a different adjacent arm in the retracted state.

The guide plate has front and rear sides, and the plurality of arms may be disposed primarily adjacent to the rear side of the guide plate. Gripper elements may be coupled to the second ends of the plurality of arms and extend through the plurality of slots from the rear to the front side of the guide plate. The rotary actuator may be disposed on the rear side of the plate and centrally aligned with the center hub.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a rear view of a system in accordance with a first embodiment, with a rotary actuator omitted for illustrative purposes.

FIG. 2 is a side-sectional view of the system of FIG. 1.

FIG. 3 is a rear view of the system of FIG. 1 with a rotary actuator depicted.

FIG. 4 is a side view of the system of FIG. 3.

DETAILED DESCRIPTION OF THE PREFERRED EMBODIMENTS

Figure 5:
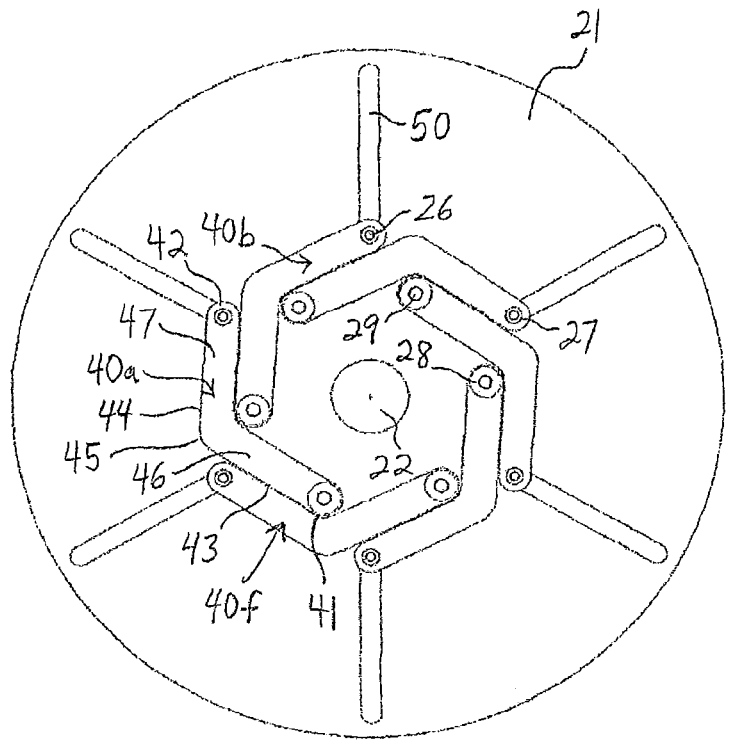
FIG. 5 is a rear view of the system of FIG. 1 in a retracted position.

Referring to FIGS. 1-8, a system 20 for gripping and holding an object within a machine is shown and described. The system 20 may grip and hold objects such as a tire bead apex or bead separator spacer, although various other objects may be engaged using the system 20 according to the techniques disclosed herein.

The system 20 generally comprises a guide plate 21, a center hub 22, a plurality of arms 40, and a plurality of slots 50. In the example shown, six arms 40 are provided, and six slots 50 are provided, such that one arm 40 is generally associated with each slot 50, as described further below. While six arms 40 and six slots 50 are shown for illustrative purposes, it will be appreciated that greater or fewer arms and slots may be used.

The plurality of slots 50 are disposed in the guide plate 21. In the embodiment of FIGS. 1-8, the plurality of slots 50 are disposed at evenly spaced apart locations about a circumferential plane of the guide plate 21, as depicted in FIG. 1. The plurality of slots 50 are oriented in radial directions, with an inner end 51 of each slot 50 terminating near the center hub 22, and outer end 52 of each slot 50 terminating near an outer perimeter of the guide plate 21, as illustrated in FIG. 1.

The plurality of arms 40 each comprise first ends 41 and second ends 42, as shown in FIG. 1. The first end 41 of each of the plurality of arms 40 is coupled to the center hub 22, and the second end 42 of each of the plurality of arms 40 is coupled to an associated slot 50.

The guide plate 21 has front and rear sides 21a and 21b, respectively, as best seen in FIG. 4. In the embodiment shown, the plurality of arms 40 are disposed primarily adjacent to the rear side 21b of the guide plate 21.

In one embodiment, the first ends 41 of the arms 40 are coupled to the center hub 22 using an arm retaining screw 29, shown in FIG. 2, which is disposed through a bearing 24 at the first end 41 of each arm 40. A bearing washer 28 may be disposed adjacent to a head of the arm retaining screw 29, as shown in FIG. 2.

The second ends 42 of the arms 40 are coupled to gripper studs 26, which may extend through the plurality of slots 50 from the rear side 21b to the front side 21a of the guide plate 21, as depicted in FIG. 2. Guide bushings 25 may be used as part of the coupling of the second ends 42 of the arms 40 to the slots 50. Further, a jam nut 27 may be used to retain the end of the gripper stud 26 that is disposed on the rear side 21b of the guide plate 21, as depicted in FIG. 2.

Figure 6:
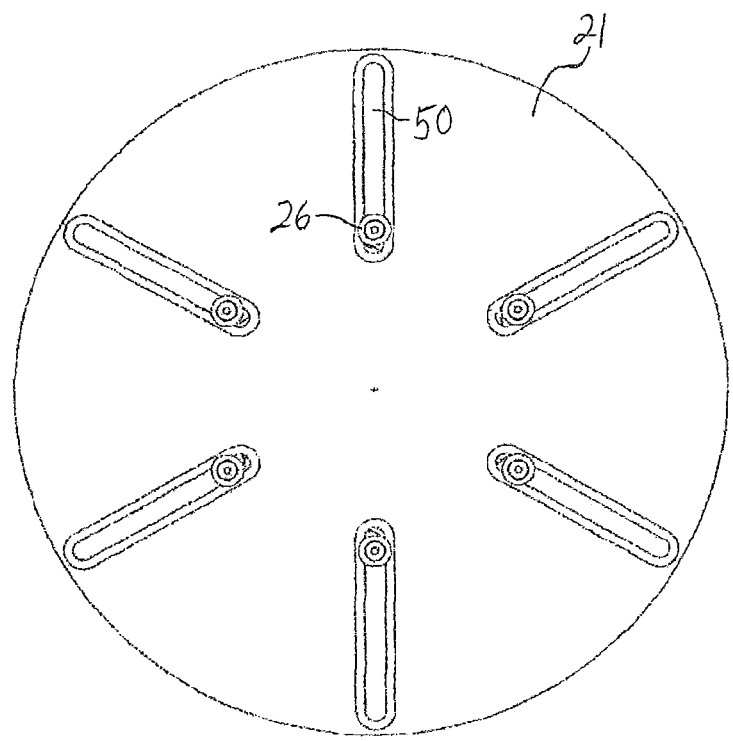
FIG. 6 is a front view of the system of FIG. 1 in the retracted position.
Figure 7:
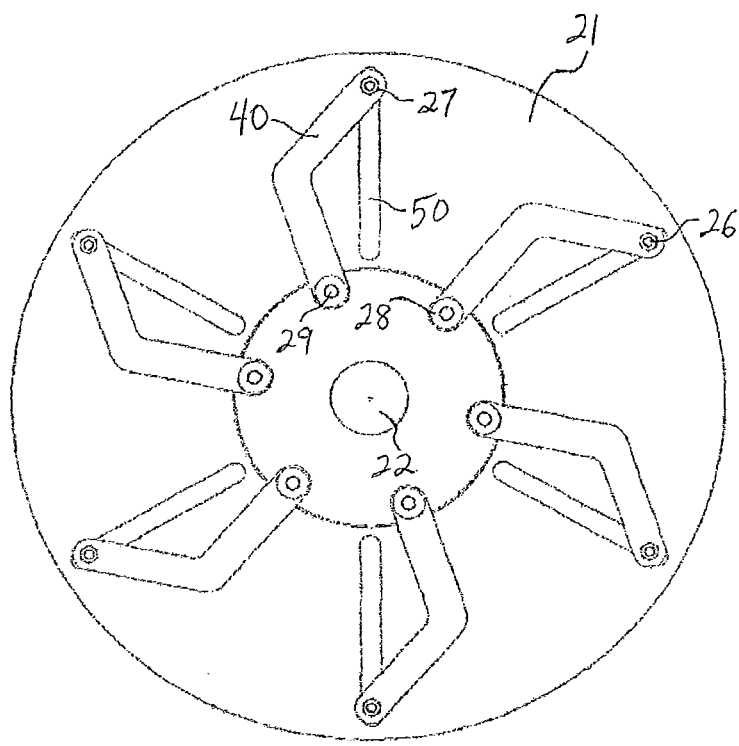
FIG. 7 is a rear view of the system of FIG. 1 in an expanded position
Figure 8:
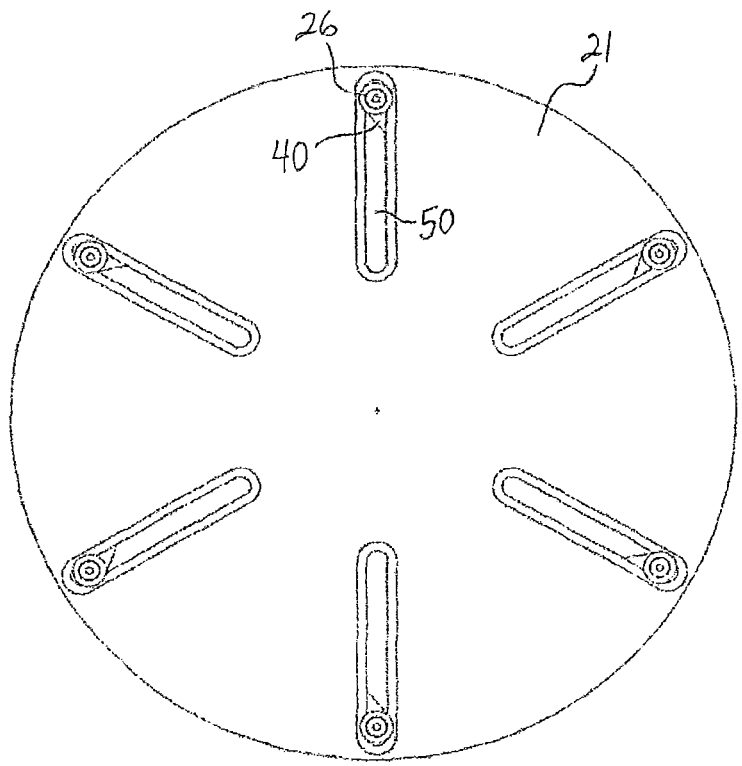
FIG. 8 is a front view of the system of FIG. 1 in the expanded position.

The center hub 22 is rotatable in first and second directions relative to the guide plate 21. Rotation of the center hub 22 in a first direction, e.g., clockwise relative to the guide plate 21, causes the second ends 42 of each of the plurality of arms 40 to move radially outward within the associated slots 50 to facilitate engagement with an object in an extended state, as shown in FIGS. 7-8. By contrast, rotation of the center hub 22 in a second direction, e.g., counterclockwise relative to the guide plate 21, causes the second ends 42 of each of the plurality of arms 40 to move radially inward within the associated slots 50 to achieve a retracted state, as shown in FIGS. 5-6.

A rotary actuator 32 is aligned with the center hub 22. The rotary actuator 32 may be disposed on a rear side 21b of the guide plate 21 and centrally aligned with the center hub 22. In one embodiment, the rotary actuator 32 is secured on a mounting plate 31, which is disposed on the rear side 21b of the guide plate 21 in a concentric manner with the rotary actuator 32 and the guide plate 21, as depicted in FIGS. 3-4.

In one non-limiting example, the rotary actuator 32 comprises a motor having a fine range of control, which is operable to cause movement of the center hub 22 in the first and second directions by applying a torque upon the center hub 22. By way of example, and without limitation, the rotary actuator 32 may be powered by hydraulic force, pneumatic force, or by electricity.

Advantageously, the use of the rotary actuator 32 and its central alignment within the system 20 facilitates direct movement of the center hub 22, and the associated arms 40, without the need for any additional complicated linkages between the actuator and the arms. This reduces the complexity of the system 20 and also saves operating space and reduces weight and cost of extra material. Moreover, intervention and changeover of parts is not required to achieve a wide different range of extended diameters of the arms 40 using the arrangement shown herein.

In one embodiment, an outer surface 44 of a first arm 40a is nested against an inner surface 43 of an adjacent arm 40f in the retracted state, as shown in FIG. 5. In the arrangement shown herein, outer surfaces 44 of each of the plurality of arms 40 are nested against inner surfaces 43 of adjacent arms in the retracted state, as shown in FIG. 5, thereby achieving a very advantageous compact state. In particular, the ability for the arms 40 to nest against one another as shown may allow for the possibility of more arms in a system while keeping the size of the system comparable to other systems having fewer and less compact arms. Furthermore, a large diameter extension range may still be achieved, even with a smaller system in the retracted state. The range of motion for the device is controlled by the diameter of the center hub 22, the size of the arms 40, and the allowable travel within the slots 50 of the guide plate 21.

The plurality of arms 40 may comprise a bend having an angle α, depicted in FIG. 1, disposed between the first and second ends 41 and 42. In one embodiment, the angle α is greater than 90 degrees and less than 180 degrees. In the exemplary embodiment shown, the angle α is more particularly between about 120 and 150 degrees, which is expected to provide particular benefits in terms of maintaining desirable radial extension of the arms 40, while also having the ability to allow the arms 40 to achieve the compact, nested state shown in FIG. 5. In one embodiment, the angle α is disposed at a center point 45 between the first and second ends 41 and 42.

Referring to FIG. 5, an exemplary first arm 40a comprises a first segment 46 disposed between the first end 41 and the center point 45, and further comprises a second segment 47 disposed between the second end 42 and the center point 45. The first segment 46 of the first arm 40a is disposed radially inward of an adjacent arm 40f in the retracted state, and the second segment 47 is disposed radially outward of a different adjacent arm 40b in the retracted state, as shown in FIG. 5. In this manner, the very advantageous compact nesting state may be achieved, thus allowing for a smaller device.

In an alternative embodiment, the single bend location having the angle α may be omitted, and the plurality of arms 40 may instead comprise a curvature along their lengths between the first and second ends 41 and 42. For example, each of the plurality of arms 40 may comprise a concave curvature, relative to the center hub 22, between their first and second ends 41 and 42. An advantageous compact nesting state, as described above, still may be achieved when using such a curvature in lieu of the bend having the angle α. It should be noted that a lower pressure angle and less contract force may occur at the sliding point of the second ends 42 due to the optimized curved or angled geometry of the arms 40.

In one exemplary, non-limiting operation for which an object to be handled by the system 20 is a tire bead, the plurality of arms 40 expand radially outward as shown in FIGS. 7-8 towards the inner diameter of a tire bead apex or bead separator spacer. The plurality of arms 40 continue to expand radially until contact with a tire bead occurs among every gripper stud 26. Even if the tire bead apex and the center of the chuck are out of alignment with each other, the system 20 can still expand and maintain equal contact with the inner diameter of the tire bead apex. The rotary actuator 32 continues to apply a torque that translates into a radial contact force to the inner diameter of the tire bead and can effectively pick up and position the tire bead. The use of gripper studs 26 coupled to the arms 40 is used to contact the inner diameter at multiple points in order to effectively pick and place the bead or spacer to a different location within a gantry system as an end effector. The rotary actuator 32 can then be rotated in the opposite direction, e.g., counterclockwise, to retract the arms 40 back to the retracted position of FIGS. 5-6.

Advantageously, the system 20 of the present embodiments can locate, center, and pick up varying sized tire beads or spacers from the same central location, whereas prior systems generally required either the chuck or the bead to be located in a different position that was dependent upon the size of the inside diameter of the tire bead or spacer.

Further, in the past, when a tire bead apex was dropped on a conveyor to be stacked for removal, the random dropping on the conveyor left the tire bead apex to be in a different position for every cycle, requiring the tire bead apex to be centered by a centering device before it can be picked up with a magnetic chuck apparatus. In the present embodiments, the use of a magnetic chuck apparatus is no longer needed since the system 20 can center, locate, and pick up by applying an equidistant contact force to the inner diameter of a cylinder, thereby allowing the device to be used with non-ferrous materials and increasing commonality of parts. Further, the system 20 effectively combines the centering device and the magnetic chuck apparatus into one device, thus saving the cost and floor space of two separate entities. Moreover, since expansion of the arms 40 envelopes a larger range of motion than with previous designs, as noted above, the same system 20 may be used with a wide range of object diameters, thus increasing commonality of parts.

Further advantages of the invention, some of which have been outlined above, include a full range of motion of diameters being achieved without adjustments needing to be made, that no linear bearing system is required, and that a lower pressure angle and less contract force may occur at the sliding point of the arms 40 due to the optimized geometry of the arms 40.

In an alternative embodiment, the guide plate 21 may be designed such that the slots 50 are rotated circumferentially such that the slot centerline is no longer coincident with the center of the center hub 22. Such alternative placement may help to reduce the pressure angle and friction forces of the guide bushing 25 coming in contact with the slots 50.

Figure 9:
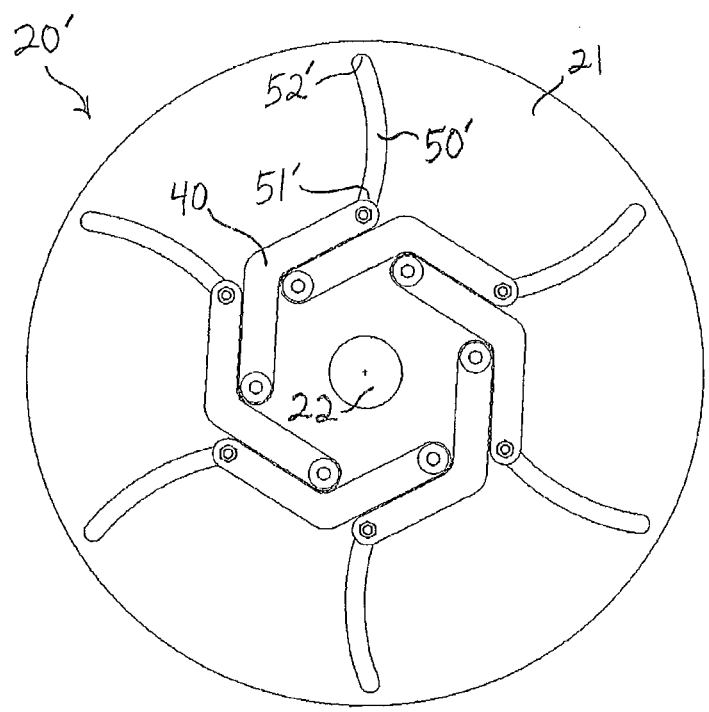
FIG. 9 is a rear view of a system in accordance with an alternative embodiment, with a rotary actuator omitted for illustrative purposes.

Referring now to FIG. 9, an alternative system 20' is similar to the system 20 of FIGS. 1-8, and shown in a retracted state similar to FIG. 5, with a main exception that alternative slots 50' are curved between first ends 51' and second ends 52'. In the non-limiting example shown, the curvature is concave between the first and second ends 51' and 52' in a direction facing counterclockwise. In alternative embodiments, the curvature may be reversed, e.g., concave between the first and second ends 51' and 52' in a direction facing clockwise. Additionally, alternative curvatures than purely concave may be provided.

Further, in the example of FIG. 9, a straight line between the first and second ends 51' and 52' would intersect at the centerline of the center hub 22. In further alternatives, the position of the first and second ends 51' and 52' may be varied, such that a straight line between the first and second ends 51' and 52' would not intersect at the centerline of the center hub 22.

Advantageously, the curved slots of FIG. 9, and the alternative variations noted, may help reduce forces imposed upon portions of the arms 40 between the retracted and expanded states, and may provide for a different engagement angle upon the object since the gripper studs will move towards the object in a curved path. Further, such curved slots may provide a longer travel path between the first and second ends of the slot, and thus a longer object engagement range, since a curved path covers a longer distance as compared to a straight line when the end points are otherwise the same.

While the systems 20 and 20' have been generally described as being designed to grip the inside diameter of the object to be moved, in an alternative embodiment, the systems 20 and 20' could grip the outside diameter of the object. In this instance, radially inward movement of the gripper studs 26 will engage the outer surface of the object, and radially outward movement of the gripper studs 26 will release the object.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

I claim:

1. A system for handling an object, the system comprising:
a guide plate;
a center hub rotatable relative to the guide plate;
a plurality of slots disposed in the guide plate; and
a plurality of arms, each having first and second ends, wherein the first end of each of the plurality of arms is coupled to the center hub, and the second end of each of the plurality of arms is coupled to an associated slot of the plurality of slots,
wherein rotation of the center hub in a first direction causes the second end of each of the plurality of arms to move radially outward within the associated slot in an extended state,
wherein an outer surface of a first arm of the plurality of arms is nested against an inner surface of a second arm of the plurality of arms in a retracted state, and
wherein the center hub is provided between the guide plate and the plurality of arms.

2. The system of claim 1 further comprising a rotary actuator aligned with the center hub, wherein the rotary actuator rotates the center hub in the first direction to achieve the extended state, and further rotates the center hub in a second direction opposing the first direction to achieve the retracted state.

3. The system of claim 1, wherein outer surfaces of each of the plurality of arms are nested against inner surfaces of adjacent arms in the retracted state.

4. The system of claim 1, wherein each of the plurality of arms comprise an angle between the first and second ends.

5. The system of claim 4, wherein the angle is greater than 90 degrees and less than 180 degrees.

6. The system of claim 4, wherein the angle of each of the plurality of arms is disposed at a center point between the first and second ends.

7. The system of claim 1, wherein the first arm comprises a first segment disposed between the first end and a center point of the first arm, and further comprises a second segment disposed between the second end and the center point, wherein the first segment is disposed radially inward of an adjacent arm in the retracted state, and wherein the second segment is disposed radially outward of a different adjacent arm in the retracted state.

8. The system of claim 1, wherein the guide plate has front and rear sides, wherein the plurality of arms are disposed primarily adjacent to the rear side of the guide plate.

9. The system of claim 8, wherein gripper elements coupled to the second ends of the plurality of arms extend through the plurality of slots from the rear to the front side of the guide plate.

10. The system of claim 8, wherein a rotary actuator is disposed on the rear side of the plate and centrally aligned with the center hub.

11. A method for handling an object, the method comprising:
providing a guide plate, and a plurality of slots disposed in the guide plate;

coupling first ends of a plurality of arms to a center hub, and coupling second ends of the plurality of arms to an associated slot of the plurality of slots;

nesting an outer surface of a first arm of the plurality of arms against an inner surface of a second arm of the plurality of arms in a retracted state; and rotating the center hub in a first direction relative to the guide plate to cause the second ends of each of the plurality of arms to move radially outward within the associated slots in an extended state, wherein the center hub is provided between the guide plate and the plurality of arms.

12. The method of claim 11, further comprising aligning a rotary actuator with the center hub, wherein the rotary actuator rotates the center hub in the first direction to achieve the extended state, and further rotates the center hub in a second direction opposing the first direction to achieve the retracted state.

13. The method of claim 11, wherein each of the plurality of arms comprise an angle between the first and second ends.

14. The method of claim 13, wherein the angle is greater than 90 degrees and less than 180 degrees.

15. The method of claim 13, wherein the angle of each of the plurality of arms is disposed at a center point between the first and second ends.

16. The method of claim 11, wherein the guide plate has front and rear sides, wherein the plurality of arms are disposed primarily adjacent the rear side of the guide plate, and wherein gripper elements coupled to the second ends of the plurality of arms extend through the plurality of slots from the rear to the front side of the guide plate.

17. A system for handling an object, the system comprising:

a guide plate;

a center hub rotatable relative to the guide plate;

a plurality of slots disposed in the guide plate;

a plurality of arms, each having first and second ends, wherein the first end of each of the plurality of arms is coupled to the center hub, and the second end of each of the plurality of arms is coupled to an associated slot of the plurality of slots; and a rotary actuator aligned with the center hub, wherein the rotary actuator rotates the center hub in a first direction to cause the second end of each of the plurality of arms to move radially outward within the associated slot in an extended state, and further rotates the center hub in a second direction opposing the first direction to achieve a retracted state, wherein the second end of one of the arms lacks radial overlap with an angle formed in an adjacent arm in the retracted state.

18. The system of claim 17, wherein an outer surface of a first arm of the plurality of arms is nested against an inner surface of a second arm of the plurality of arms in the retracted state.

19. The system of claim 17, wherein each of the plurality of arms comprise an angle between the first and second ends.

20. The system of claim 19, wherein the angle is greater than 90 degrees and less than 180 degrees.

\* \* \* \* \*